Sept. 23, 1952 D. B. HARRIS 2,611,825

MULTICHANNEL TRANSMISSION SYSTEM

Filed April 28, 1948 7 Sheets-Sheet 1

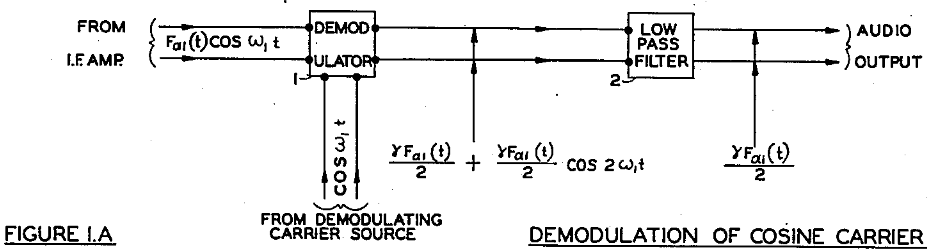

FIGURE 1.A DEMODULATION OF COSINE CARRIER

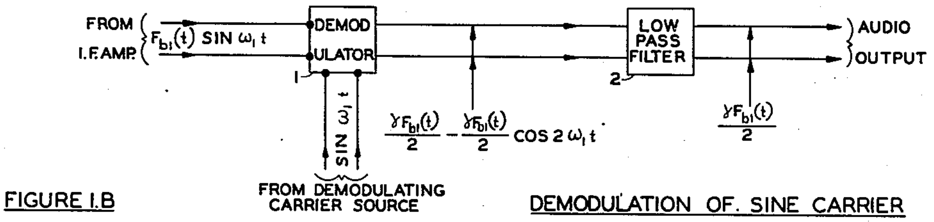

FIGURE 1.B DEMODULATION OF SINE CARRIER

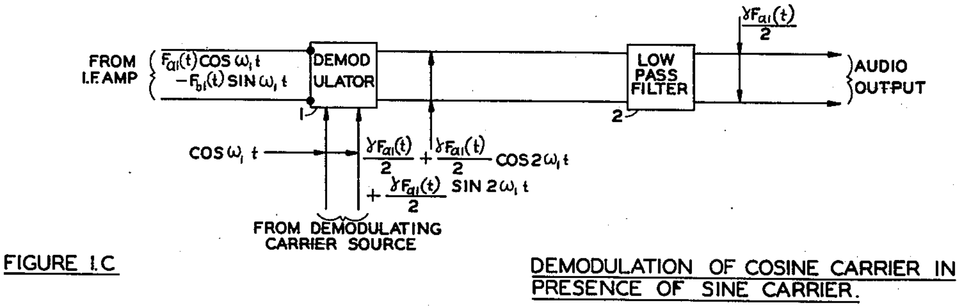

FIGURE 1.C DEMODULATION OF COSINE CARRIER IN PRESENCE OF SINE CARRIER.

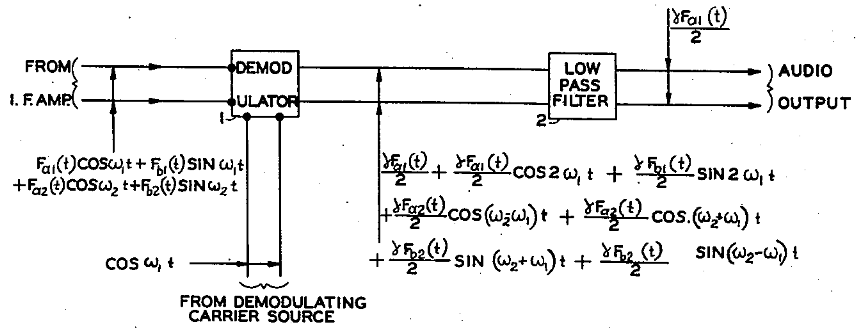

FIGURE 1.D DEMODULATION OF COSINE CARRIER IN THE PRESENCE OF SINE CARRIER ON SAME FREQUENCY AND COSINE AND SINE CARRIERS ON ANOTHER FREQUENCY.

FIGURE 1. THE PRODUCT DEMODULATION PRINCIPLE

INVENTOR.
Donald B. Harris.
BY
Williamson & Williamson
ATTORNEYS

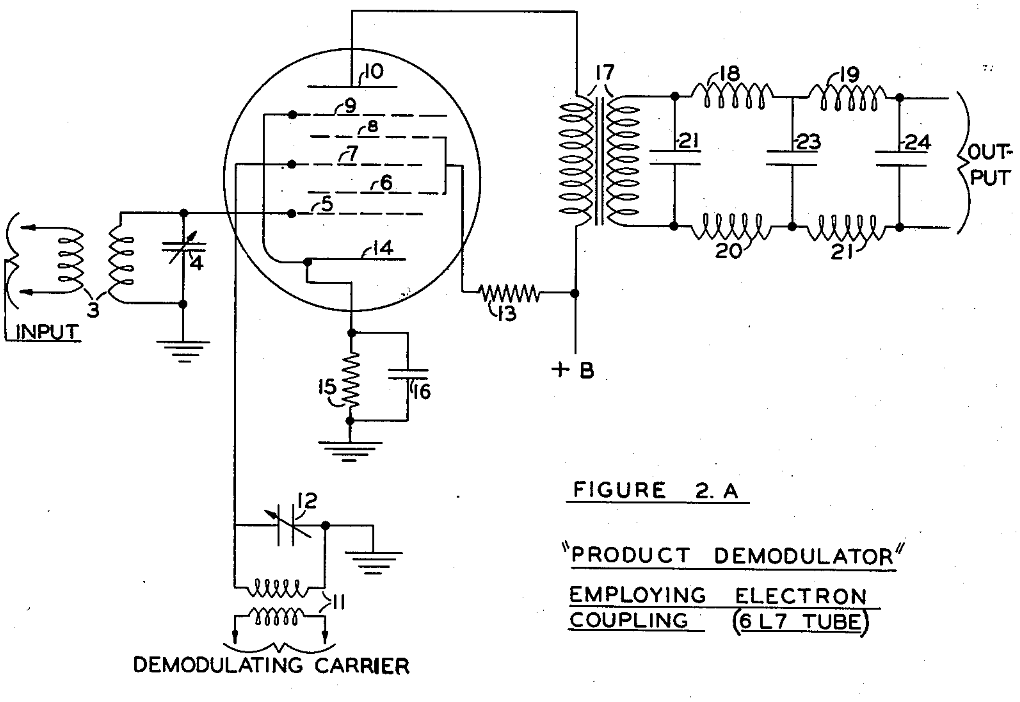
FIGURE 2. A
"PRODUCT DEMODULATOR"
EMPLOYING ELECTRON COUPLING (6 L7 TUBE)
FIGURE 2 B
6 L7 TUBE CHARACTERISTIC - EFFECT OF OSCILLATOR GRID VOLTAGE ON SIGNAL GRID-PLATE TRANSCONDUCTANCE.
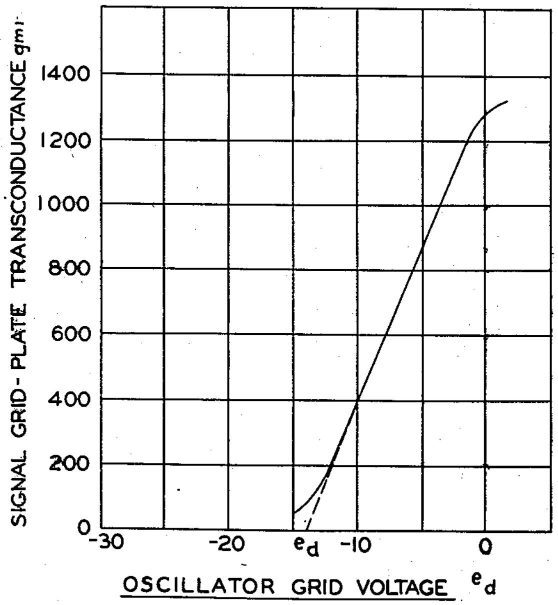
FIGURE 2. PRODUCT DEMODULATOR
INVENTOR.
Donald B. Harris.
BY
Williamson & Williamson
ATTORNEYS Sept. 23, 1952 D. B. HARRIS 2,611,825

MULTICHANNEL TRANSMISSION SYSTEM

Filed April 28, 1948 7 Sheets-Sheet 3

8 CHANNEL SYSTEM

EMPLOYING MULTIVIBRATIONS FOR DERIVATION OF DEMODULATING CARRIERS

INVENTOR.

Donald B. Harris

BY

Williamson & Williamson

ATTORNEYS

FIGURE 4. 8 CHANNEL SYSTEM EMPLOYING MODULATED CONTROL CARRIER

INVENTOR.
Donald B. Harris.
BY
Williamson & Williamson
ATTORNEYS

FREQUENCY ALLOCATIONS IN I.F. STAGES FOR FREQUENCY CONVERSION METHOD APPLIED TO MICRO-WAVE TRANSMISSION.

INVENTOR.
Donald B. Harris
BY
Williamson & Williamson
ATTORNEYS

Sept. 23, 1952 D. B. HARRIS 2,611,825

MULTICHANNEL TRANSMISSION SYSTEM

Filed April 28, 1948 7 Sheets-Sheet 6

8 CHANNEL SYSTEM EMPLOYING SEPARATE SYNCHRONIZED OSCILLATORS

INVENTOR.
Donald B. Harris.

BY

Williamson & Williamson
ATTORNEYS

FIGURE 7 DETAILED SCHEMATIC CIRCUIT OF SYNCHRONIZED OSCILLATOR-DEMODULATORS USED IN FIGURE 6.
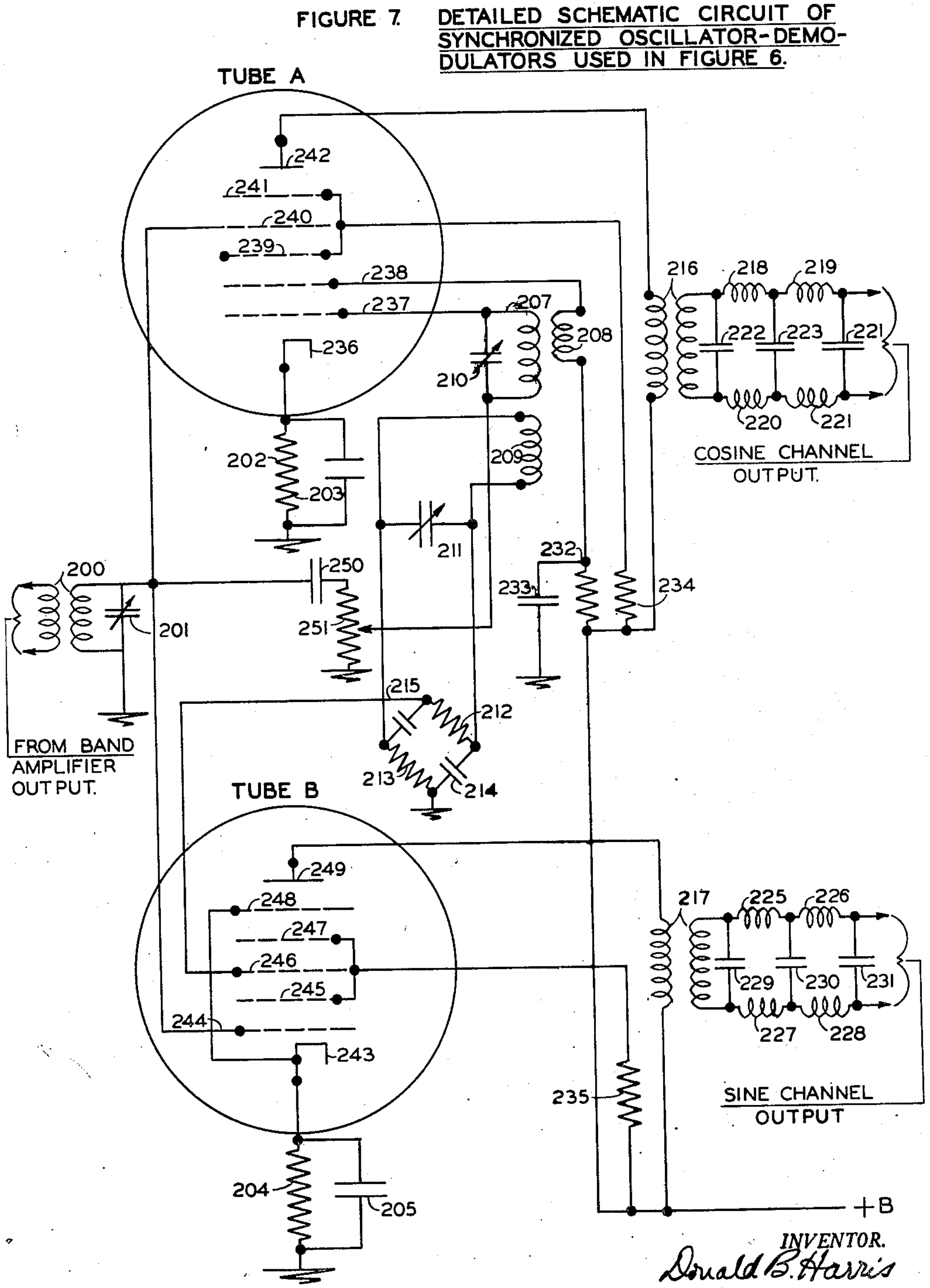
INVENTOR.
Donald B. Harris
BY
Williamson & Williamson
ATTORNEYS Patented Sept. 23, 1952 2,611,825

UNITED STATES PATENT OFFICE 2,611,825

MULTICHANNEL TRANSMISSION SYSTEM

Donald B. Harris, Cedar Rapids, Iowa

Application April 28, 1948, Serial No. 23,667

6 Claims. (Cl. 179—15)

Figure 3:
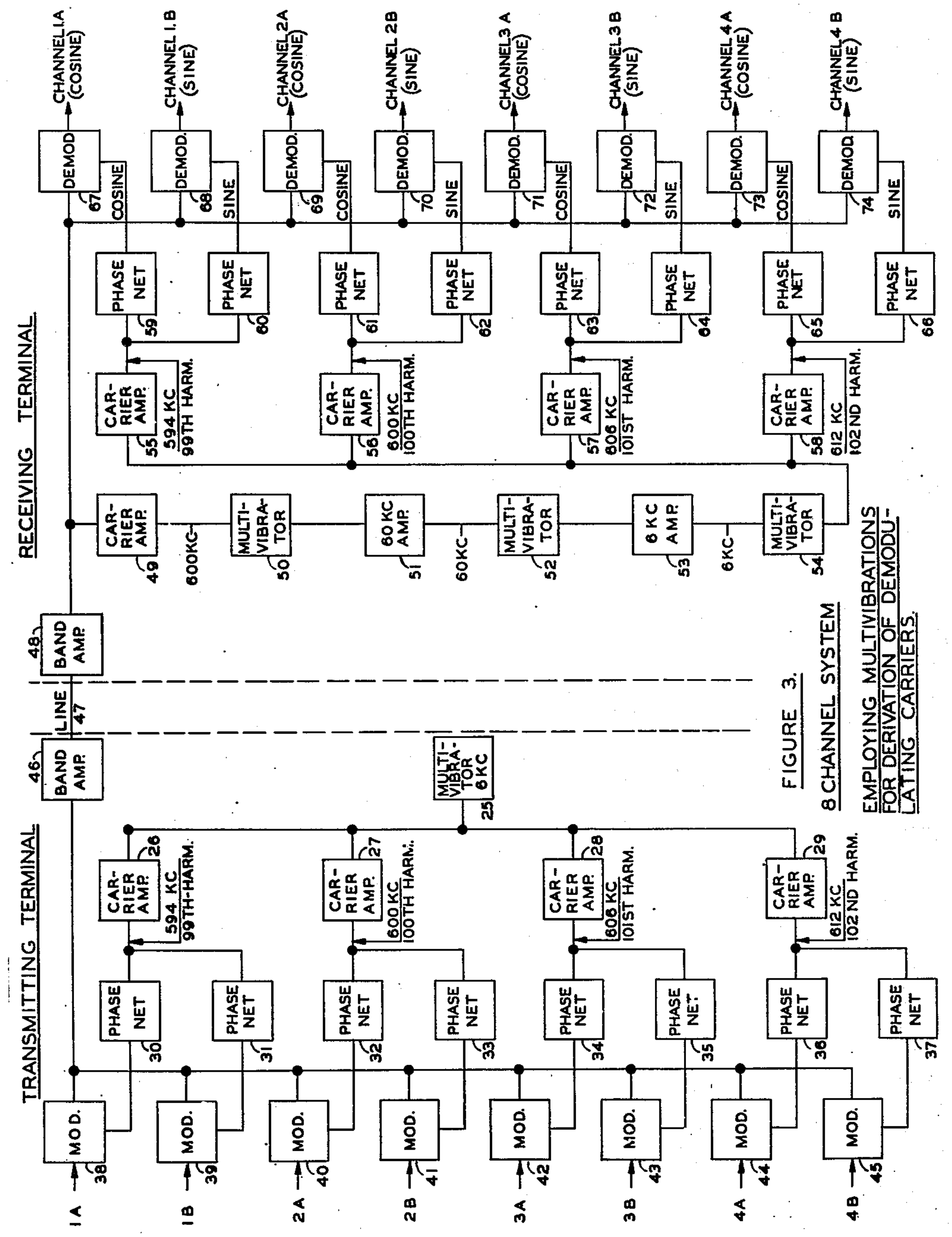

This invention relates to multi-channel transmission systems of the type adapted to transmit a plurality of messages simultaneously over a common facility such as a telephone line, or a coaxial cable; or through a common transmission medium, as by means of a radio wave.

In the case of wire lines, present frequency-division multiplex "carrier" systems share the disadvantage that although in many cases the cheapest available instrumentality for effecting communication between two points, they are nevertheless unduly costly in comparison with other electronic systems containing a comparable amount of apparatus, such as, for example, radio broadcast receivers. This excessive cost is due, to a considerable extent, to the fact that all present multi-channel carrier systems are provided with filters adapted at the transmitting terminal to select and transmit either the upper or lower sideband of the signal produced by each modulator, but not both, and at the receiving terminal to select and segregate not only the particular channel frequency but also the particular sideband required, before impressing the signal on the demodulator. As these filters operate at relatively low frequencies, they contain components of comparatively large size, which are bulky and expensive; and in order effectively to utilize the available frequency space of the transmission medium they must be designed to extremely close frequency and bandwidth tolerances, adding to their complexity and cost of manufacture. This practice of pre-selection of the desired channel also results in a requirement that the frequency deviation of the carrier be held within close limits, in order to avoid any possible drift of a given channel into the frequency space reserved for neighboring channels. The resulting refinement in design required in the oscillators and other equipment used to generate the carriers also adds to the cost.

Efforts to employ pre-selecting carrier equipment of this type in conjunction with radio transmitters and receivers for the purpose of producing multi-channel radio transmission systems have so far not been successful. If a multi-channel band is generated at relatively low frequencies by means of existing carrier equipment, and this band is used to modulate a radio wave which is detected in the receiver to restore the multi-channel band, the cross-modulation resulting from the non-linear characteristics of the radio system modulators and detectors makes it necessary to reduce the individual channel levels to a point where the operation of the system is not economical. If, on the other hand, an attempt is made to select and separate the channels at radio or intermediate frequencies, it becomes mandatory to provide large frequency separations between the channels, in order to allow for the unavoidable drift of the carrier frequencies. At microwave frequencies, these separations become so large as to render the system as a whole extremely wasteful of frequency space. If, for example, operation at 4000 megacycles with a frequency stability of ±.005 per cent is assumed (a stringent requirement which has not yet been attained in practice), it is evident that each carrier may be expected to drift 200 kilocycles to either side of its nominal frequency. Under these conditions, it is seen that a channel bandwidth of 403,000 cycles is required to transmit and receive each 3000 cycle channel. A system containing 120 channels will therefore require an overall bandwidth of $120 \times 403{,}000$ cycles=48.36 megacycles, compared with a bandwidth of .36 megacycle, which would be required if all the frequency space were utilized.

As a matter of fact, in the present condition of the art, other difficulties relating to lack of R. F. selectivity and cross-modulation in the radio frequency stages have made it necessary to separate the channels still further, so that in systems now in experimental operation each channel is separated 40 megacycles from its nearest neighbor. A bandwidth of more than 40,000,000 cycles is therefore required to transmit a single channel only 3000 cycles wide, and it is obvious that true multi-channel operation cannot be carried out under these conditions.

In the present invention, design economies are effected and full advantage of the available frequency space is taken by eliminating the channel selecting filters, and obtaining the required selectivity as an adjunct to the process of demodulation. Both sidebands of each channel are generated at the transmitting terminal; the carrier may or may not be suppressed, depending on the amount of interchannel crosstalk which can be tolerated. In this fashion, a multi-channel band is produced at relatively low frequency. This band may be transmitted directly to the receiving terminal over a wire, cable, or coaxial line, or may be used to modulate a radio frequency carrier for transmission by radio.

At the receiving terminal, the incoming signal, containing the entire spectrum, is amplified in radio-frequency and intermediate frequency amplifiers, or in the case of wire, cable, or coaxial transmission, in a carrier frequency amplifier, without attempting to separate the channels or sidebands before amplification. If radio transmission is employed, the signal is in general heterodyned with a local oscillator signal during this process, so that the multi-channel band after amplification occupies approximately the same frequency space as it occupied in the transmitter following the original modulation process. The complex signal is then applied, in parallel, to a number of demodulators, one for each channel. These demodulators are of the "linear" type, so that cross-modulation between the channels is not produced in the process of demodulation. Each demodulator is supplied with a demodulating carrier identical in frequency and phase with the carrier of the channel to be demodulated, as this carrier appears at the demodulator, and is so constituted that its useful output is a linear function of the product of the instantaneous amplitude of the signal impressed on the demodulator input, and the instantaneous amplitude of the demodulating carrier. As the output signal is a linear function of the input signal, cross-modulation between channels does not occur in the demodulator, although the signal impressed on the input of each demodulator contains the carriers and side-bands of all channels in the entire spectrum. Under these conditions the output of the demodulator contains the original modulation of the particular channel to be demodulated, plus frequency components representing the other channels in the band but in all cases displaced in frequency upward beyond the highest modulation frequency of the channel being demodulated. These components are removed by the integrating action of a low-pass filter in the output of the demodulator, so that only the original modulation of the demodulated channel remains.

In order to assure proper conformance in frequency and phase between the channel carriers and the demodulating carriers, the demodulating carriers are maintained in step with their corresponding channel carriers, either by deriving the demodulating carriers from a "control carrier" transmitted from the transmitting terminal, or by injecting a portion of the channel carrier voltage into the oscillator of each channel demodulator. Any variations in phase or frequency caused by instability in the oscillators of the transmitting and receiving terminals, by the transmission medium, or by changes in the circuit constants of the equipment, are imparted equally to the channel carriers and their corresponding demodulating carriers and they remain exactly in phase at all times.

If, in the case of radio transmission, therefore, the radio frequency carrier drifts, the entire transmitted spectrum drifts with it, the various channels and the control carrier maintaining the same relative positions with respect to each other; and as the channels are not separated until after demodulation, this drift is of no consequence from the standpoint of channel selectivity. As a result, the spacing of the channels in the spectrum can be made very small, the magnitude of this spacing being principally dependent on the sharpness of the cutoff characteristics of the low pass filters in the output of the demodulators. For example, if these filters can be designed to produce a large attenuation 500 cycles beyond the cutoff point, the spacing between channels need be only 500 cycles. The transmitted band of a 120 channel system, assuming a channel bandwidth of 3000 cycles and double side-band transmission, will therefore be only $120\times2\times3500$ cycles or 840,000 cycles. If this band is transmitted by radio at a frequency of 4000 megacycles, with a frequency stability of $\pm.005\%$, the total bandwidth in the receiver will be 840,000+400,000 cycles, or 1.24 megacycles, allowing 200,000 cycles on either side of the band for drift of the entire band due to carrier instability.

As this bandwidth is still more than twice that theoretically required for perfect utilization of the frequency space, additional provisions are made for further reduction of the band-width. These provisions consist of sending two channels on the frequency of each channel carrier. As outlined later in the theoretical discussion of the system, two carriers having the same frequency but separated in phase by 90° may be individually modulated in the transmitting terminal and separately demodulated in the receiving terminal by multiplying the received signal by the amplitude of a demodulating carrier of the same phase and frequency as the carrier being demodulated. The phase-shifted demodulating carrier required is in practice provided by passing the in phase carrier through a phase network which alters its phase by 90°.

A 120 channel system is therefore produced by utilizing the frequency space ordinarily required for 60 channels. Under these conditions, the frequency space required for a 120 channel system, assuming a 3000 cycle channel bandwidth and a channel separation of 500 cycles is $60\times2\times3500$ cycles, or 420,000 cycles. If this spectrum is transmitted by radio at a frequency of 4000 megacycles, with a frequency tolerance of $\pm.005\%$, the drift allowance of 200,000 cycles on each side of the band, required on account of carrier instability, results in a total band-width requirement of 420,000+400,000 cycles, or .82 megacycle. This requirement is to be compared with a theoretical optimum bandwidth of .36 megacycle applicable to perfect utilization of the frequency space, and with a bandwidth of 48.36 megacycles apparently theoretically obtainable with pre-selecting systems. It is also noted that present experimental systems, in which the channel separation is 40 megacycles, would require the impossibly large bandwidth of 4800 megacycles if extended to include 120 channels.

Three embodiments of the invention are disclosed herein. These embodiments differ principally in the manner in which the control carrier is generated, transmitted, and applied to the receiver to produce the required demodulating carriers.

For low frequency applications, such as carrier transmission over stable facilities permitting direct transmission of the original AM band, a common low frequency master control carrier is employed in the transmitter. The frequency of this master carrier is in general twice the audio band-width. E. g., if each transmitted channel is 3000 cycles wide before modulation, the frequency of the master carrier is 6000 cps. The master carrier is applied to a non-linear element for the purpose of generating harmonics. Selected harmonics are then used as the channel carriers. For example, if it is desired to operate 4 channels at a transmission frequency of about 600,000 cycles, the 99th, 100th, 101st, and 102nd harmonics of the 6000 cycle master carrier may be used as channel carriers. One of these carriers is also used as the control carrier and is transmitted; the others may be suppressed in the interests of avoiding intelligible cross-modulation. At the receiving terminal, the control carrier is selected by means of a very narrow filter and applied to a series of multi-vibrators which successively reduce the frequency in steps to restore the original master frequency of 6000 cps., at the same time eliminating the sidebands originally attached to the control carrier. The 6000 cycle output of the final multi-vibrator is then applied to a non-linear element and to appropriate filters adapted to select the proper harmonics for use as demodulating carriers. In the case cited, the 99th, 100th, 101st and 102nd harmonics are selected and applied to the respective demodulators.

This multi-vibrator system may also be employed for radio transmission in cases where it is possible at the receiving terminal to restore the multi-channel band to its original frequency by "detection" or rectification. If excessive cross-modulation results from such detection, this procedure cannot be used and it is necessary to resort to frequency conversion by means of a heterodyne oscillator in order to reduce the band frequency to approximately its original value. The drift of the oscillator then imparts unequal phase or frequency deviation to the control carrier with respect to the channel carriers, and unsatisfactory operation results.

Where frequency conversion is used to restore the multi-channel band to its original frequency, a second system for deriving the control carrier is therefore employed. As in the first case, a master carrier having a frequency equal to twice the audio band-width is employed. If, for example, the audio bandwidth selected is 4000 cycles, the master carrier has a frequency of 8000 cycles. At the transmitting terminal this master carrier modulates a control carrier at an intermediate frequency, and also harmonics of the master carrier are heterodyned with the control carrier to generate the channel carriers. The control carrier is displaced by a substantial frequency interval from the channel carriers, to facilitate separation in the receiving terminal. The modulated control and channel carriers are now used to modulate a radio frequency wave, which may be in the microwave region. At the receiving terminal, the received signal is reduced to a suitable intermediate frequency by a mixer and heterodyne oscillator. The modulated control carrier is separated from the channel carriers by means of a band pass filter sufficiently wide to accommodate the drift of the local oscillator, and is rectified to restore the original 8000 cycle master carrier. Harmonics of this master carrier are then heterodyned with the control carrier to generate the demodulating carriers, exactly as in the transmitting terminal. With this system changes in the frequency or phase of the local oscillator are imparted equally to the demodulating carriers and their corresponding channel carriers, which remain in phase at all times.

The third system of operation is applicable to direct transmission of the multi-channel band or to cases where detection can be employed in the receiving terminal to restore the multi-channel band to its original position. This system is particularly effective in conjunction with frequency modulation of a radio-frequency carrier. At the transmitting terminal, each channel carrier is independently generated by a separate oscillator, which is preferably a part of a combined mixer-oscillator. As in the case of the systems previously described, the channel carriers are generated at relatively low frequency, to produce a low frequency multi-channel band in which all carriers are transmitted. This band frequency modulates a radio-frequency carrier. At the receiving terminal, the received signal is heterodyned with a local oscillator, amplified at an intermediate frequency and impressed on a discriminator, which restores the original multi-channel band. After amplification, the band is then impressed on the channel demodulators in parallel. Each demodulator has its own oscillator, which is pulled into step with the proper carrier by injecting a small amount of the signal voltage into the oscillator; although voltages from all carriers enter each oscillator, the oscillator pulls into step only with the particular carrier to which it is most closely tuned. The output of the oscillator is then impressed on the demodulator to bring about product demodulation, as previously described. In practice, the demodulator and oscillator may be contained in the same tube.

It is an object of my invention to produce a multi-channel transmission system in which preselection of the desired channel at the receiver is dispensed with.

It is another object of my invention to provide means whereby, in a multi-channel transmission system, two channels may be transmitted at each carrier frequency, through employment of two carriers in quadrature at each frequency.

A further object of my invention is to eliminate excessive separations between channels, required in conventional preselecting radio systems on account of carrier instability, by so applying the modulation to a common radio frequency carrier that all channels drift together as the carrier varies in frequency, maintaining a constant frequency relationship between themselves, thereby reducing the margin between the edges of the transmitted band and the cutoff frequencies of the R. F., I. F. and carrier amplifiers to that which would be required to accommodate the instability of the unmodulated carrier.

It is a further object of the invention to effectuate the transmission of a multi-channel spectrum superimposed on a radio frequency carrier without excessive interchannel cross-modulation in the receiver, through employment of a system of demodulation in which the demodulating carrier is applied to a separate terminal of the demodulator making it unnecessary to resort to non-linear demodulator characteristics affecting the entire received spectrum.

An additional object of the invention is to provide a demodulator of the electron-coupled type in which the output current contains the necessary "pure product" of the channel being demodulated, and the demodulating carrier applied to a separate terminal of the demodulator, while at the same time, products between channels are eliminated.

It is a further object of the invention to improve the signal to noise ratio of a multi-channel transmission system by reducing the band-width requirements of each channel to those actually needed for the transmission of the channel.

Another object of the invention is to reduce the adverse effect of carrier instability and make possible the employment of less stable and less costly oscillators by imparting the carrier drift equally to all channels, rather than individually and at random to each channel.

Figure 4:
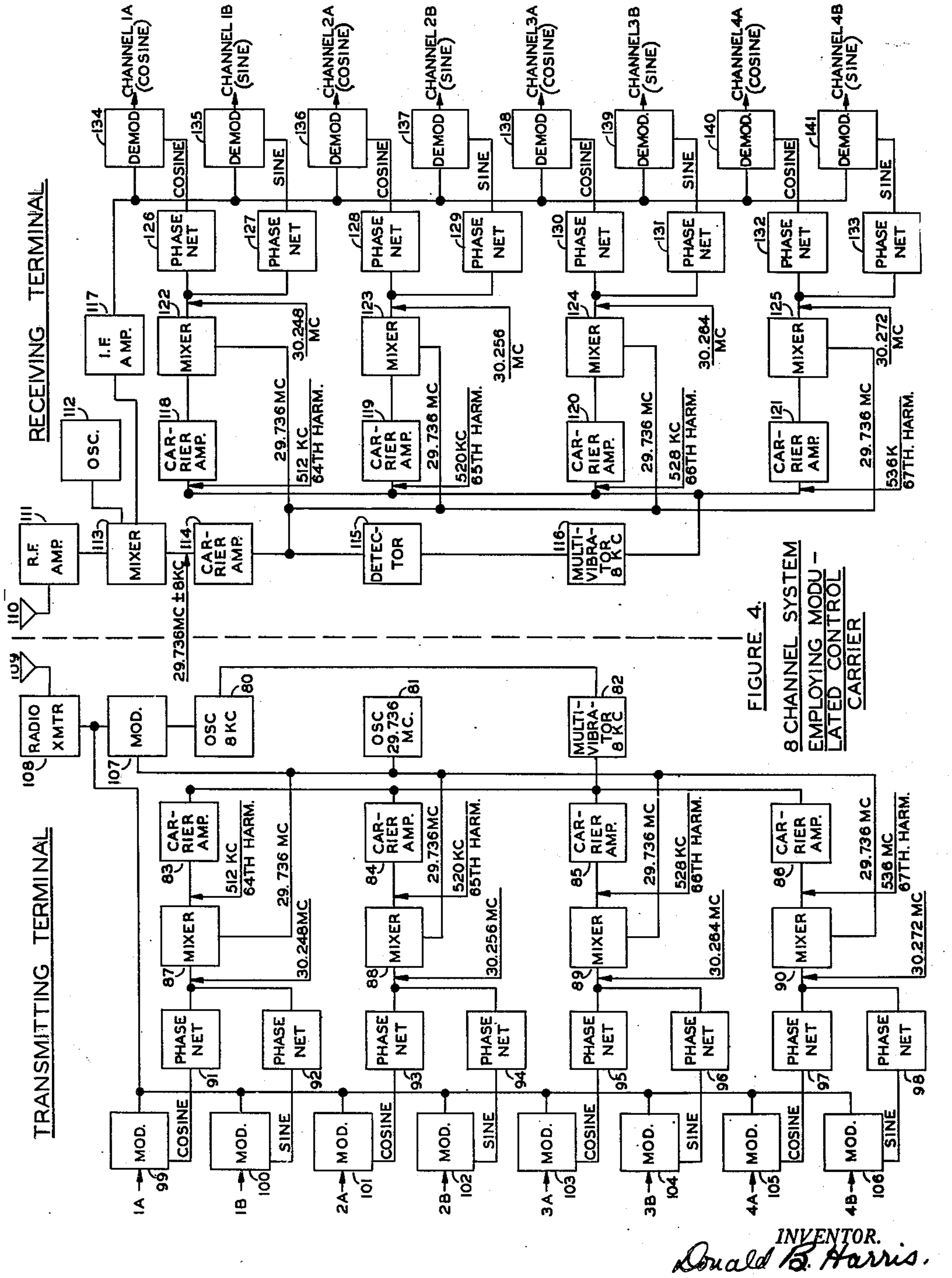
Figure 5:
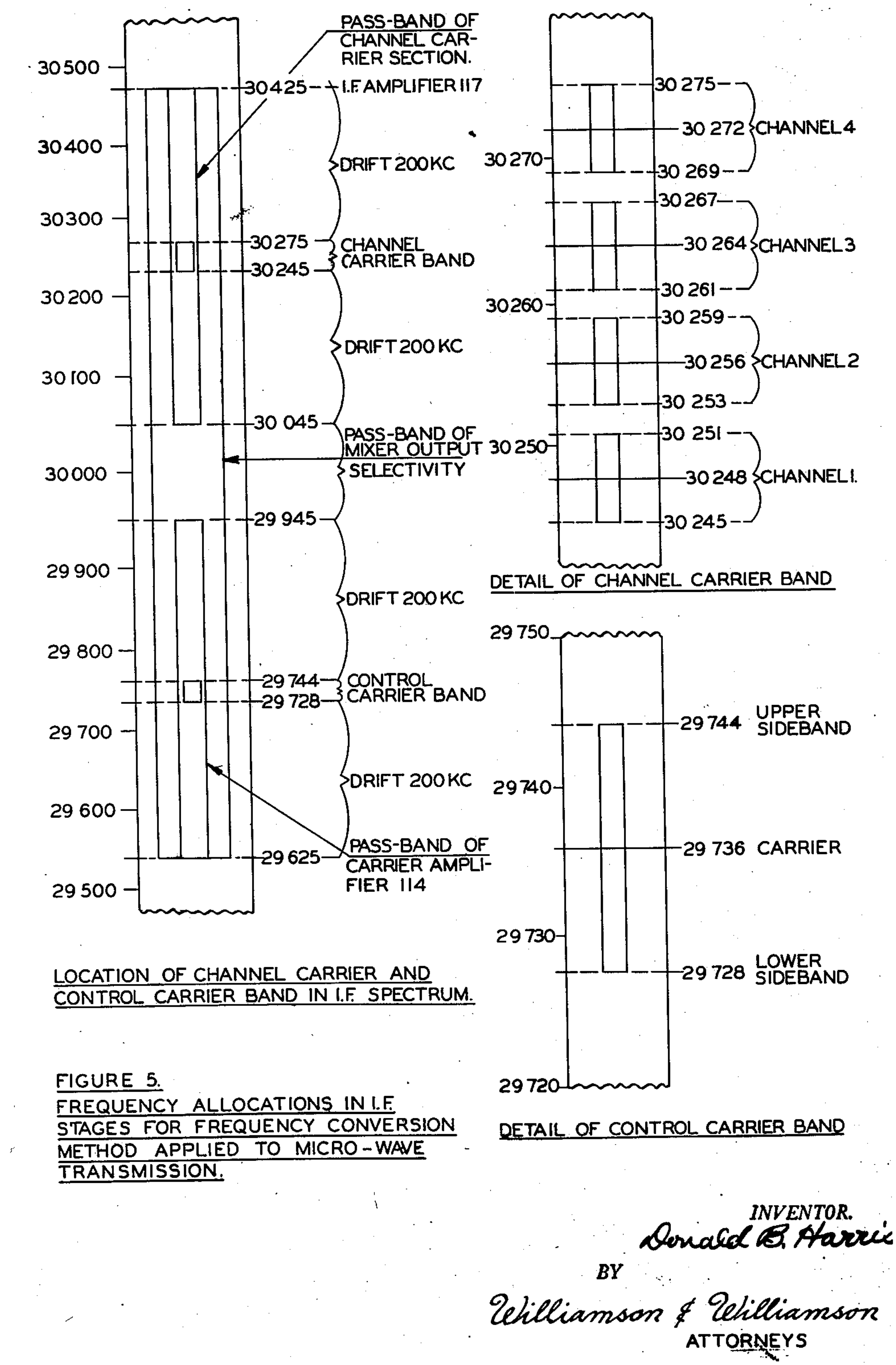
Figure 6:
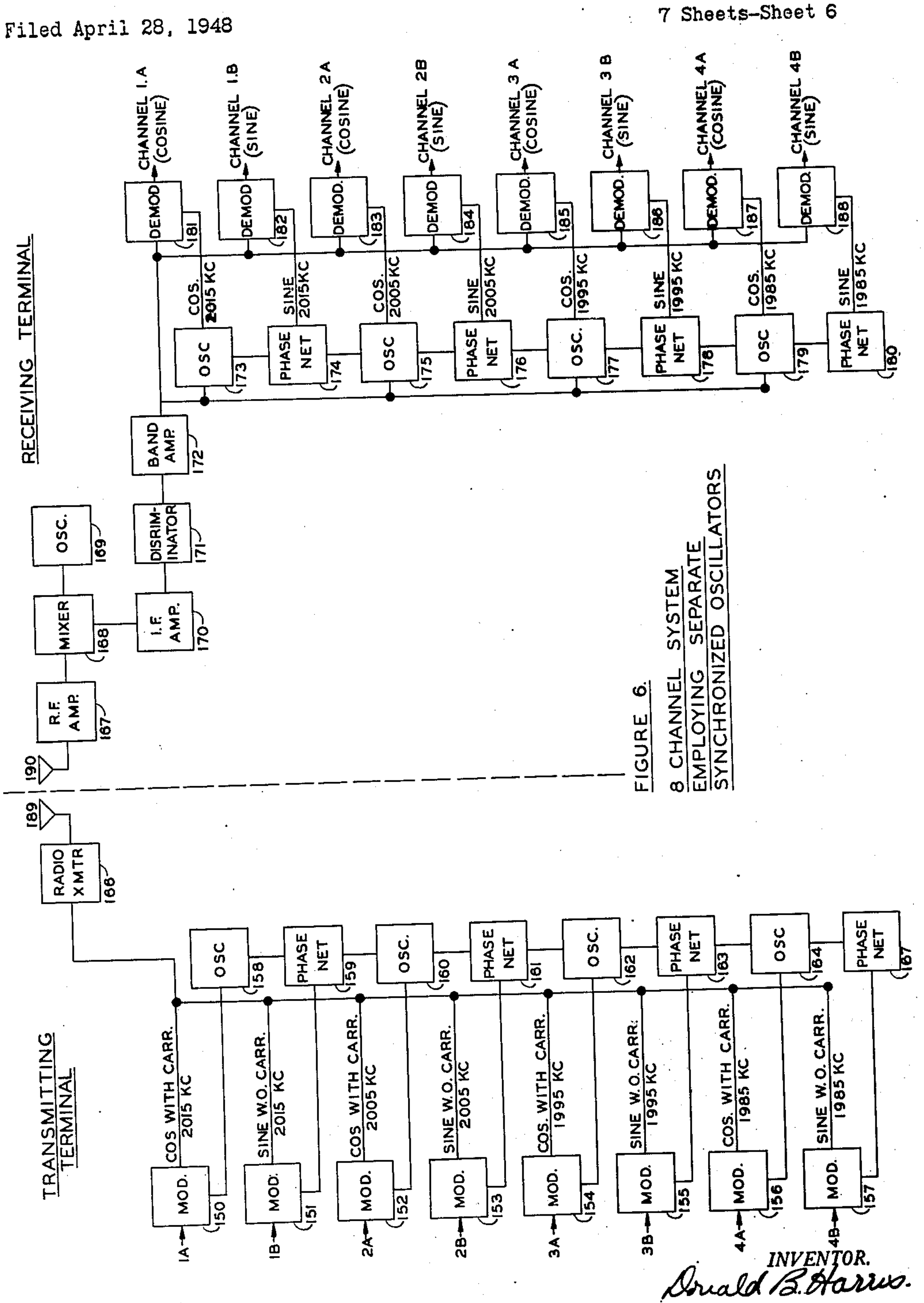

These and other objects of the invention can best be understood by reference to the following figures, which show in detail the structure of the circuits involved and their components:

Figure 1—The product demodulation principle.
Figure 1A—Demodulation of cosine carrier.
Figure 1B—Demodulation of sine carrier.
Figure 1C—Demodulation of cosine carrier in presence of sine carrier.
Figure 1D—Demodulation of cosine carrier in presence of sine carrier on same frequency, and cosine and sine carriers on another frequency.
Figure 2—Product demodulator.
Figure 2A—Product demodulator employing electron coupling.
Figure 2B—6L7 tube characteristic—Effect of oscillator grid voltage on signal grid-plate transconductance.
Figure 3—8 channel system employing multivibrators for derivation of demodulating carriers.
Figure 4—8 channel system employing modulated control carrier.
Figure 5—Frequency allocations in I. F. stages for frequency conversion method applied to micro-wave transmission.
Figure 6—8 channel system employing separate synchronized oscillators.
Figure 7—Detailed schematic circuit of synchronized oscillator-demodulators used in Figure 6.

Figure 1 demonstrates the basic theory of the type of "product demodulation" employed in this invention. This theory is outlined in detail in the technical paper, "Selective demodulation" by D. B. Harris, published in the June 1947 issue of the Proceedings of the Institute of Radio Engineers. The following brief digest presents the salient points of the analysis as it is applicable to this invention.

In all cases, a type of demodulator is employed in which the output is a linear function of the product of the instantaneous amplitude of a voltage applied to one terminal of the demodulator, and the instantaneous amplitude of a second voltage applied to another terminal of the demodulator. This relationship may be stated mathematically by the equation:

$$i_0=\gamma e_i e_d \qquad (1)$$

Where $i_0$ is the instantaneous output current, $e_i$ is the voltage applied to the input terminal, $e_d$ is a demodulating voltage applied to another terminal, and $\gamma$ is a constant depending on the structure of the demodulator.

If now, the input voltage is a modulated wave of the form $$e_i=F_{a1}(t)\cos w_1t \qquad (2)$$

Where $F_{a1}(t)$ is a function containing a modulating voltage, and $w_1$ is $2\pi$ times the carrier frequency, $f_1$, and if the demodulating voltage is $$e_d=\cos w_1t \qquad (3)$$

then the output current, from Equation 1 will be $$i_0=\gamma F_{a1}(t)\cos w_1t\cos a_1t=\gamma F_{a1}(t)\cos^2 w_1t$$
$$=\gamma\frac{F_{a1}(t)}{2}+\gamma\frac{F_a(t)}{2}\cos 2w_1t \qquad (4)$$

This output current is seen to contain the original modulating function $F_{a1}(t)$, and a modulated wave having a carrier frequency of twice the original carrier frequency. The output current may now be passed through a low-pass filter, which eliminates the high frequency modulated wave, leaving only the original modulating function $F_{a1}(t)$. Complete demodulation is thus effected.

Figure 1A shows the demodulation of a modulated cosine carrier, in accordance with Equations 1 to 4. The modulated wave, $F_{a1}(t)\cos w_1t$, is applied to the left hand or input terminals of demodulator 1, while at the same time, the demodulating carrier, $\cos w_1t$, is applied to the bottom terminals. The output of the demodulator is then $$\gamma\frac{F_{a1}(t)}{2}+\gamma\frac{F_{a1}(t)}{2}\cos 2w_1t$$

in accordance with Equation 4. The low pass filter, 2, eliminates the high frequency component, leaving the original modulating function $$\gamma\frac{F_{a1}(t)}{2}$$

for delivery at the output of the filter.

In a similar manner, a modulated sine carrier may be demodulated by multiplying by a sine demodulating carrier, as shown in Figure 1B. In this case, an input wave, $$e_i=F\beta_1(t)\sin w_1t \qquad (5)$$

is multiplied in demodulator 1 by a demodulating carrier, $$e_d=\sin w_1t \qquad (6)$$

to give, in accordance with Equation 1, an output current, $$i_0=\gamma\frac{F_{b1}(t)}{2}-\gamma\frac{F_{b1}(t)}{2}\cos 2w_1t \qquad (7)$$

which when passed through low pass filter 2 is reduced to the original modulating function $$\gamma\frac{F_{b1}(t)}{2}$$

Figure 1C shows that two modulated waves having carriers of the same frequency but differing in phase by 90° may be independently demodulated in a product demodulator of this type. Here, the input wave is $$e_i=F_{a1}(t)\cos a_1t+F_{b1}(t)\sin w_1t \qquad (8)$$

where $F_{b1}(t)$ is a second modulating function.

If the demodulating carrier applied to the bottom terminals of the demodulator, 1, is, as shown in the figure, $$e_d=\cos a_1t \qquad (9)$$

the output of the demodulator, in accordance with Equation 1 is:

$$i_0=\gamma\frac{E_a(t)}{2}+\gamma\frac{F_{a1}(t)}{2}\cos 2w_1t+\gamma\frac{F_{b1}(t)}{2}\sin(0)+\gamma\frac{F_{b1}(t)}{2}\sin 2w_1t \qquad (10)$$

The first term is the desired original modulating function, the 2nd and 4th terms are modulated waves having carrier frequencies twice as great as that of the received wave, and the third term is zero. This demodulator output is now impressed on low pass filter 2, which eliminates the double frequency terms, leaving the desired modulating function, $$\gamma\frac{F_{a1}(t)}{2}$$

at the output of the filter.

In a similar manner, it can be proven that if the input wave of Equation 8 is multiplied in demodulator 1 by a demodulating carrier, $$e_d=\sin w_1t$$

and the resulting output current is passed through low pass filter 2, the output of the filter will be $$\gamma\frac{F_{b1}(t)}{2}$$

the modulating function attached to the sine carrier. Thus, either the cosine or sine carrier may be demodulated, depending upon whether the demodulating carrier is a cosine or a sine wave.

When the received wave contains modulated carriers of more than one frequency, each carrier may be independently demodulated by this method, as demonstrated by Figure 1D. In this case, the input wave applied to demodulator 1 is $$e_1=F_{a1}(t)\cos w_1t+F_{b1}(t)\sin w_1t+F_{a2}(t)\cos w_2t+F_{b2}(t)\sin w_2t \quad (11)$$

Figure 1D shows the case where this wave is demodulated by multiplying in demodulator 2 by a demodulating carrier:

$$e_d=\cos w_1t \quad (12)$$

The output of the demodulator is found, by substituting in Equation 1 and performing elementary trigonometric transformations, to be:

are absent. On the other hand, as the output current is a linear function of the demodulating voltage as well, it is possible to produce at will the useful product terms which result in demodulation, and only these product terms. The conventional method of detection might be characterized as a "heterogeneous" method, in which all components of the input wave are multiplied together, with resulting confusion, waste, and creation of spurious products, in order to obtain a single useful demodulation product. The demodulation method of this invention is an "orderly" method, in which the same desired result is obtained directly, with the creation of a minimum of unwanted spurious products.

The output current of Equation 13 is now passed through filter 2 which removes all terms except the first, $$\frac{\gamma F_{a1}(t)}{2}$$

the modulating function attached to the cosine carrier of frequency $$\frac{w_1}{2\pi}$$

which is the desired product of demodulation, and which is delivered at the output of the filter.

In a similar manner it can be proven that if the input wave of Equation 11 is multiplied in $$i_0=\overbrace{\gamma\frac{F_{a1}(t)}{2}}^{1}+\overbrace{\gamma\frac{F_{a1}(t)}{2}\cos 2w_1t}^{2}+\overbrace{\gamma\frac{F_{b1}(t)}{2}\sin 2w_1t}^{3}+\overbrace{\gamma\frac{F_{b1}(t)}{2}\sin(0)}^{4}+\overbrace{\gamma\frac{F_{a2}(t)}{2}\cos(w_2-w_1)t}^{5}+$$
$$\overbrace{\gamma\frac{F_{a2}(t)}{2}\cos(w_2+w_1)t}^{6}+\overbrace{\gamma\frac{F_{b2}(t)}{2}\sin(w_2+w_1)t}^{7}+\overbrace{\gamma\frac{F_{b2}(t)}{2}\sin(w_2-w_1)t}^{8} \quad (13)$$

It is noted that the 4th term is zero, and disappears.

It is also noted that, due to the linear demodulator characteristic, there are no cross-modulation terms containing the products of the amplitudes of the various components of the input wave of Equation 11. Such cross-modulation terms result when conventional non-linear demodulators such as square-law detectors or plate detectors are employed without preselection, due to the fact that in the case of such detectors the instantaneous output current is a function of a power of the input voltage. The application of a non-filtered spectrum of the type defined by Equation 11 to the input of such a detector therefore produces a plate current which is equal in value to the value of the expansion of a polynomial, representing the amplitude of the input wave, raised to a power not equal to 1. Such an expansion contains terms representing the product of each component of the input wave by every other component of the input wave. When the input wave contains the carriers of the various channels, some of these terms are the useful demodulation products, but others represent cross-modulation between channels. Where nonlinear detectors are employed, it is therefore necessary to eliminate the unwanted components by prefiltering before the demodulation process takes place, in order to avoid cross-modulation.

Conversely, it is possible to dispense with preliminary filtering only if a type of demodulator be employed in which the output current is substantially a linear function of the input voltage, as in this invention. In this case, as demonstrated by Equation 13, cross-modulation terms demodulator 1 by a demodulating carrier, $e_d=\sin w_1t_1$ the output of filter 2 will be $$\frac{\gamma F_{b1}(t)}{2}$$

A demodulating carrier $e_d=\cos w_2t$ gives $$\frac{\gamma F_{a2}(t)}{2}$$

and if $e_d$ is $\sin w_2t$, $$\frac{\gamma F_{b2}(t)}{2}$$

will be obtained at the output terminals of the filter. Thus, any of the four modulated waves may be demodulated at will by choosing a demodulating carrier having a frequency and phase angle identical with that of the carrier being demodulated.

Since $w_1$ and $w_2$ represent any two frequencies, it is evident that this principle may be extended to cover the demodulation of a series of modulated waves having different carrier frequencies, a cosine carrier and a sine carrier being employed at each of the chosen frequencies in the series. It is of course necessary that low pass filter 2 have a characteristic such that it will cut-off the unwanted demodulation products and pass the desired modulating function; and that the carrier frequencies be so spaced as to render this result possible. This leads to the requirement that the cutoff frequency of the filter shall be equal to the highest frequency in the modulating function, F($t$) of the channel being demodulated, and that the carriers shall be spaced twice this distance apart in frequency, assuming that all modulating functions have the same upper frequency limits. The application of a numerical example to Equation 13 will make this clear. If we assume that the modulating functions $F_{a1}(t)$, $F_{b1}(t)$, $F_{a2}(t)$ and $F_{b2}(t)$ are audio frequency bands having upper limits at 3000 cps. we see that in accordance with the above requirement, the carriers must be spaced 6000 cycles apart. If, then $$\frac{w_1}{2\pi}=f_1=10,000 \text{ cps.}$$

(for example), $$\frac{w_2}{2\pi}=f_2$$

will be 16,000 cps. Terms 2 and 3 will then represent modulated waves having carrier frequencies at 32,000 cps. and lower and upper sidebands terminating at 29,000 and 35,000 cps. respectively. Term 4 is zero, and vanishes. Terms 5 and 8 have carriers at 16,000–10,000 or 6000 cps. with lower and upper sidebands terminating at 3000 cps. and 9000 cps. respectively. The carrier frequency of terms 6 and 7 is 36,000 cps. and their sidebands extend from 33,000 to 39,000 cps. Under these conditions all terms except the first, $F_{a1}(t)$, which has a top frequency of 3000 cps. are eliminated by the 3000 cycle cutoff filter. It is to be observed, however, that if the carriers had been spaced less than 6000 cycles apart, or if the cutoff frequency of the filter had been higher than 3000 cycles, terms 5 and 8 would have contained components which would have passed through the filter.

In practice it is, of course, impossible to construct a filter which will cut off so sharply as to cause infinite attenuation above the cutoff frequency, and none below it. It is, therefore, necessary in the practical design of the circuit, to space the carriers a little farther apart than twice the highest frequency in the modulating functions.

In some applications it is possible to dispense with filter 2 entirely, as for example where the load circuit to which the output of demodulator 1 is delivered is not responsive to the extraneous terms of higher frequency, and their suppression is therefore not required.

It is to be noted that the action of filter 2 is equivalent to "averaging" or integrating the amplitude of the wave delivered to it by demodulator 1. The combined action of demodulator 1 and filter 2 may therefore be said to result in integrating the product of the amplitude of the demodulating carrier and the amplitude of the input wave.

It may easily be shown, in fact, that the most general mathematical expression for the combined action of the product demodulator and filter is an equation stated in the integral form. For the average output current obtained at the output of the filter is seen to be:

$$I_0=\frac{Q}{T} \qquad (13A)$$

where Q is the quantity of electricity flowing throughout an averaging interval of length T. In turn the value of Q may be found from the relationship $$i_0=\frac{dQ}{dt};\ dQ=i_0dt;\ Q=\int_0^T i_0dt \qquad (13B)$$

so that if $i_0$ be of the form of Equation 1, we have, by substitution in Equation 13A:

$$I_0=\frac{\gamma}{T}\int_0^T e_ie_ddt \qquad (13C)$$

If now the input wave be of the form of Equation 11, generalized for a series of terms, $$e_i=[\Sigma F_{an}(t)\cos nwt+\Sigma F_{bn}(t)\sin nwt] \qquad (13D)$$

where $$\frac{w}{2\pi}$$

is a fundamental carrier frequency, of which all other carriers in the spectrum are harmonics, we then have, by substitution in Equation 13C, the relation:

$$I_0=\frac{\gamma}{T}\int_0^T[\Sigma F_{an}(t)\cos nwt+\Sigma F_{bn}(t)\sin nwt]e_ddt \qquad (13E)$$

The demodulating wave may be expressed in most general form as:

$$e_d=\cos nwt \qquad (13F)$$

or $$e_d=\sin nwt \qquad (13G)$$

depending upon whether demodulation of the cosine or of the sine channel is being effected. It is also seen that if the period of integration is taken to be the period of the fundamental carrier, $$\left(T=\frac{2\pi}{w}\right)$$

and if $F(t)$ remains substantially constant during this period, all unwanted components integrate to zero; and the most general expressions for the demodulation of the cosine and sine channels are found, by substitution of (13F) and (13G) in (13E), to be:

$$I_0=\frac{\gamma w}{2\pi}\int_0^{\frac{2\pi}{w}}[\Sigma F_{an}(t)\cos nwt+\Sigma F_{bn}(t)\sin nwt]\cos nwt\,dt$$
$$=\frac{\gamma F_{an}(t)}{2} \qquad (13H)$$

and $$I_0=\frac{\gamma w}{2\pi}\int_0^{\frac{2\pi}{w}}[\Sigma F_{an}(t)\cos nwt+\Sigma F_{bn}(t)\sin nwt]\sin nwt\,dt$$
$$=\frac{\gamma F_{bn}(t)}{2} \qquad (13I)$$

respectively.

These equations express the overall operation of the combined system, and the averaging action of the filter in the most precise possible mathematical form. It is also seen that the function of integration might be carried out by means other than a filter, as for example, by an integrating circuit adapted to integrate the demodulator output wave over one exact cycle of the fundamental carrier frequency.

Figure 2 shows a practical "product demodulator" of the type described in general in Figure 1, employing a 6L7 pentagrid mixer tube. As indicated in Figure 2B, the center portion of the characteristic of the tube relating the oscillator grid voltage $e_d$, to the signal grid-plate transconductance $g_{m1}$, is substantially a straight line, defined by the equation, $$g_{m1}=\gamma(e_d-e_0) \qquad (14)$$

Where $g_{m1}$ is the signal grid to plate transconductance, $e_0$ is the voltage value at which an extension of the straight portion of the characteristic intersects the horizontal axis, $e_d$ is the instantaneous value of the voltage applied to the oscillator grid, and $\gamma$ is a constant representing the slope of the curve.

For values of load impedance which are small with respect to the plate impedance, the plate current, $i_0$ is given by:

$$i_0=(g_{m1}e_i+g_{md}e_d) \quad (15)$$

where $e_i$ is the voltage applied to the signal grid, and $g_{md}$ is the oscillator grid-plate transconductance.

Substituting (14) in (15) we obtain, $$i_0=\gamma(e_d-e_0)e_i+g_{md}e_d \quad (16)$$

$$=\gamma e_d e_i-\gamma e_0 e_i+g_{md}e_d$$

Or, neglecting the high frequency 2nd and 3rd terms, which will not pass through the output filter, $$i_0=\gamma e_d e_i \quad (17)$$

This equation is seen to be identical with Equation 1, which expresses the relationship required in order to bring about product demodulation. If an incoming modulated wave having an instantaneous amplitude, $e_i$ is therefore impressed on the signal grid of the tube, and a demodulating carrier is impressed on the oscillator grid, the relationships described in Figure 1 and defined by Equations 1 to 13 apply.

In practice, as shown in Figure 2A, the incoming signal $e_i$, after passing through transformer 3, the secondary winding of which is tuned by condenser 4 to the frequency of the carrier being demodulated, is impressed on signal grid 5. The demodulating carrier, $e_d$, is delivered to oscillator grid 7 by transformer 11, the secondary winding of which is tuned to the frequency of the demodulating carrier by condenser 12. Grids 6 and 8 perform the usual and well-known functions of a screen grid, being maintained at the proper potential by voltages derived from the plate supply, B+, through resistor 13. Grid 9 is a suppressor grid provided for the purpose of suppressing secondary emission. Cathode 14 is maintained at the proper bias by bias resistor 15 which is shunted by condenser 16 in order to bypass alternating current. The output of the tube, $i_0$, containing the wanted demodulation product, and the higher frequency extraneous components, is delivered by transformer 17 to the low pass output filter, which comprises inductances 18, 19, 20 and 21 and condensers 22, 23 and 24. Operating in the usual and well-known manner of low-pass filters, this filter removes the unwanted product of demodulation, and delivers the particular modulating function, $F(t)$ which is wanted, at its output terminals.

Figure 3 is a block diagram showing a complete 8 channel system of the first type mentioned previously, in which the demodulating carriers are derived in the receiving terminal by means of multi-vibrators. The demodulators in this system are identical with Figure 2A; as the operation of all other components is well known, a detailed circuit drawing is not provided.

The eight channels are identified in Figure 3 as channels 1A, 1B, 2A, 2B, 3A, 3B, 4A and 4B, and it is assumed that the modulating functions applied to the inputs of these channels at the transmitting terminal are $F_{a1}(t)$, $F_{b1}(t)$, $F_{a2}(t)$, $F_{b2}(t)$, $F_{a3}(t)$, $F_{b3}(t)$, $F_{a4}(t)$ and $F_{b4}(t)$, respectively. Multivibrator 25 constitutes a common source for all carriers used in the system. This multivibrator, operating at a fundamental frequency of 6000 cps., twice the band width of the modulating audio frequency signal, generates a square topped wave which is rich in harmonics. Its output is impressed in parallel on carrier amplifiers 26, 27, 28 and 29, which are tuned sharply to the particular harmonics which it is desired to use as channel carriers. Considering the operation of channels 1A and 1B, the carrier frequency of which is 594 kc. carrier amplifier 26 is tuned sharply to 594 kc., and therefore selects the 99th harmonic of the multi-vibrator frequency, amplifies it, and delivers it in parallel to phase networks 30 and 31. Phase network 30 is designed to transmit a cosine wave, which is impressed on the oscillator input terminal of modulator 38. This modulator is a conventional balanced modulator, arranged to generate a double side-band, carrier suppressed wave. The output of this modulator will therefore be of the type defined by Equation 2;

$$e_{a1}=F_{a1}(t)\cos w_1t \quad (18)$$

in which $$\frac{w_1}{2\pi}=f_1=594\times10^3$$

Phase network 31 is designed to transmit a wave delayed 90° with respect to the output of phase network 30; or in other words, a sine wave. This wave is used as the channel carrier of modulator 39, which is also a balanced modulator generating a double side band, carrier suppressed wave. The output of modulator 39 is therefore of the type defined by Equation 5;

$$e_{b1}=F_{b1}(t)\sin w_1t \quad (19)$$

in which $$\frac{w_1}{2\pi}=f_1 \text{ is again } 594\times10^3$$

The structure of the channel 2 transmitting equipment, including carrier amplifier 27, phase networks 32 and 33, and modulators 40 and 41 is identical with that described above for channel 1, except that the carrier frequency selected by carrier amplifier 27 is the 100th harmonic, 600 kc. and modulator 40 is slightly unbalanced for the purpose of transmitting a small amount of the 600 kc. cosine carrier to the line. This carrier functions in the receiving terminal as a control carrier, from which the demodulating carriers are derived. The outputs of modulators 40 and 41 are therefore, respectively:

$$e_{a2}=F_{a2}(t)\cos w_2t+E\cos w_2t \quad (20)$$

and $$e_{b2}=F_{b2}(t)\sin w_2t \quad (21)$$

where $$\frac{w_2}{2\pi}=f_2=600\times10^3$$

and E is the amplitude of the unmodulated carrier transmitted.

In a similar manner, carrier amplifier 28 in channel 3 selects the 101st harmonic of the multivibrator frequency, 606 kc., and delivers it through cosine phase network 34 and sine phase network 35 to balanced modulators 42 and 43 respectively; and carrier amplifier 29 in channel 4 selects the 102nd harmonic, 612 kc., for delivery to balanced modulators 44 and 45 through cosine phase network 36 and sine phase network 37 respectively. The outputs of modulators 42, 43, 44 and 45 are therefore, respectively, $$e_{a3}=F_{a3}(t)\cos w_3t \quad (22)$$

$$e_{b3}=F_{b3}(t)\sin w_3t \quad (23)$$

$$e_{a4}=F_{a4}(t)\cos w_4t \quad (24)$$

and $$e_{b4}=F_{b4}(t)\sin w_4t \quad (25)$$

where $$\frac{w_3}{2\pi}=f_3=606\times10^3 \text{ and } \frac{w_4}{2\pi}=f_4=612\times10^3$$

The eight modulated waves are now impressed in parallel on band amplifier 46, which amplifies them collaterally, and delivers them to line 47.

At the receiving terminal, receiving band amplifier 48 again amplifies the entire band of frequencies, and impresses it in parallel on carrier amplifier 49 and on demodulators 67, 68, 69, 70, 71, 72, 73 and 74, which are all product demodulators identical with Figure 2A. The instantaneous potential of the complex wave impressed on the carrier amplifier and demodulators is:

$$e_i=K[F_{a1}(t)\cos w_1t+F_{b1}(t)\sin w_1t+F_{a2}(t)\cos w_2t+F_{b2}(t)\sin w_2t+F_{a3}(t)\cos w_3t+F_{b3}(t)\sin w_3t+F_{a4}(t)\cos w_4t+F_{b4}(T)\sin w_4t+E\cos w_2t] \qquad (26)$$

where K is a constant depending on the loss in the line and the gain in band amplifiers 46 and 48, and the expression in brackets is the sum of the waves emitted by the individual transmitting modulators, as defined by Equations 18 to 25, inclusive.

Carrier amplifier 49 selects the final term in Equation 26, $E\cos w_2t$, amplifies it and impresses it on multi-vibrator 50. It is to be noted that although the 3rd and 4th terms in Equation 26 also have carrier frequencies $$\frac{w_2}{2\pi}=600\times10^3$$

these terms actually represent sidebands extending to both sides of the carrier with no carrier present. Since carrier amplifier 49 is very sharply tuned it passes very little of these sidebands, and the voltage impressed on multi-vibrator 50 is fundamently that of the 600 kc. control carrier.

Multi-vibrator 50 operates at a fundamental frequency of 60 kc. In the well-known manner of multi-vibrators, it therefore emits a 60 kc. flat topped wave, which is automatically synchronized with the 600 kc. control carrier. The output of multi-vibrator 50 is impressed on 60 kc. amplifier 51, which amplifies the 60 kc. wave, removes the harmonics, further attenuates that small amount of side-band component which passed through amplifier 49 and multi-vibrator 50, and impresses the 60 kc. wave on multi-vibrator 52.

Multi-vibrator 52 operates at a fundamental frequency of 6 kc. in synchronism with the 60 kc. wave derived from multi-vibrator 50, and therefore also in synchronism with the 600 kc. control carrier. The 600 kc. control carrier is in turn a harmonic of the wave emitted by the master multi-vibrator 25 in the transmitting terminal. The output of multi-vibrator 52 is therefore identical in frequency with that of multi-vibrator 25 and it differs in phase from that of multi-vibrator 25 only by the amount of phase shifts caused by the line and by the band amplifiers, which affect all channel carriers equally.

The 6 kc. wave emitted by multi-vibrator 52 is amplified by 6 kc. amplifier 53, which further attenuates any residual harmonic or side-band components, delivering a practically pure 6 kc. wave to multi-vibrator 54. Multi-vibrator 54 also operates at 6 kc., and emits a flat-topped wave, rich in harmonics, which is impressed in parallel on carrier amplifiers 55, 56, 57, and 58. These carrier amplifiers are identical with carrier amplifies 26, 27, 28, and 29 in the transmitting terminal, and perform the function of selecting the 99th harmonic, 594 kc., the 100th harmonic, 600 kc., the 101st harmonic, 606 kc., and the 102nd harmonic, 612 kc., for use as the demodulating carriers of channels 1, 2, 3 and 4, respectively.

Considering the operation of channel 1 only, the 594 kc. wave delivered by carrier amplifier 55 is transmitted as a cosine wave $\cos w_1t$ through phase network 59 to demodulator 67. The output of demodulator 67 is the product of the input wave $e_i$ defined by Equation 26, and the demodulating carrier $e_d=\cos w_1t$. The operation of Equation 13 is therefore performed by demodulator 67, which delivers to the output terminals of channel 1A the original modulating function $F_{a1}(t)$ which was associated with that channel at the transmitting terminal.

The 594 kc. output of carrier amplifier 55 is also delivered as a sine wave, $\sin w_1t$, through phase network 60 to demodulator 68. Demodulator 68 multiplies the input wave $e_i$ as defined by Equation 26, by the demodulating carrier $e_d=\sin w_1t$ to produce at the output terminals of channel 1B $F_{b1}(t)$, the modulating function originally associated with that channel at the transmitting terminal.

The 100th harmonic of multi-vibrator 54, having a frequency of 600 kc., is, in a similar manner, selected by carrier amplifier 56 and applied as a cosine function to demodulator 69, through phase network 61 and as a sine function to demodulator 70 through phase network 62, to produce, at the output of channels 2A and 2B, the modulating functions $F_{a2}(t)$ and $F_{b2}(t)$ which were originally associated with those channels at the transmitting terminals. Carrier amplifier 57 selects the 101st harmonic, 606 kc. and applies it through cosine phase network 63 to demodulator 71 and through sine phase network 64 to demodulator 72, to produce at the output terminals of channels 3A and 3B, respectively, the correct modulating functions $F_{a3}(t)$ and $F_{b3}(t)$. In the same manner, carrier amplifier 58, phase networks 65 and 66, and demodulators 73 and 74 produce at the output of channels 4A and 4B, the original functions $F_{a4}(t)$ and $F_{b4}(t)$.

Thus, the entire complex wave is demodulated, the respective modulating functions being delivered at the proper output terminals of the receiving terminals.

As previously explained, the system of Figure 3 is successful when it is possible to maintain a high degree of stability in the frequencies of the channel and control carriers. This condition will in general obtain when wire transmission at the original modulated frequency can be employed, or when the entire low frequency modulated band can be used to modulated a radio frequency carrier which is in turn rectified to restore the low frequency band in the receiving terminal. If considerations relating to cross-modulation make this impossible, a second method of operation, shown in Figure 4, is utilized. In the system of Figure 4, radio transmission is employed, but cross-modulation is eliminated by avoiding the use of rectifiers or detectors in the channel equipment of the receiving terminal. The multi-channel band is restored to approximately its original position in the spectrum by means of a heterodyne oscillator, and means are incorporated to permit this oscillator to drift in frequency without disturbing the selection of the demodulating carriers.

In Figure 4, the fundamental frequency for all carriers is derived from oscillator 80 which operates at a frequency of 8000 cps. equal to twice the audio band-width, taken in the case of this example to be 4000 cps., and from oscillator 81, which emits a control carrier at a nominal intermediate frequency, in this case taken to be 29.736 megacycles per second. Harmonics of oscillator 80 are heterodyned with the output of oscillator 81 to provide the channel carriers. In order to develop these harmonics, oscillator 80 triggers multi-vibrator 82, which also operates at a fundamental frequency of 8000 cps., and has an output rich in harmonics. Carrier amplifiers 83, 84, 85 and 86 select the proper harmonics for their respective channels, and impess them on mixers 87, 88, 89 and 90, where they are heterodyned with the control carrier, 29.736 mc. to produce sum frequencies which are used as the channel carriers.

This process can be made clear by considering the operation of channel 1. In this channel, carrier amplifier 83 selects the 64th harmonic of multi-vibrator 82, 512 kc., amplifies it, and delivers it to one input terminal of mixer 87, on the other input terminal of which is impressed the control carrier, 29.736 mc. In the well known manner of mixers, mixer 87 produces the sum and difference frequencies of these two input waves. The sum frequency, 30.248 mc. is selected by the output circuit of the mixer, and is delivered through phase network 91 as a cosine wave to modulator 99, and through phase network 92 as a sine wave to modulator 100. The outputs of channels 1A and 1B are therefore $$e_{a1}=F_{a1}(t)\cos w_1t \qquad (27)$$

and $$e_{b1}=F_{b1}(t)\sin w_1t \qquad (28)$$

where $$\frac{w_1}{2\pi}=30.248 \text{ mc.}$$

In a similar manner, carrier amplifier 84 selects the 65th harmonic, 520 kc., mixer 88 adds this frequency to the control carrier to produce a frequency of 30.256 mc. and this frequency is used as the channel carrier of channel 2, applied to modulator 101 through phase network 93 as a cosine wave, and to modulator 102 through phase network 94 as a sine wave. Carrier amplifier 85 selects the 66th harmonic, 528 kc., and delivers it to mixer 89, which heterodynes it with the control carrier to produce the sum frequency, 30.264 mc. which is used as the channel carrier of channel 3, applied to modulator 103 through phase network 95 as a cosine wave and to modulator 104 through phase network 96 as a sine wave. The 67th harmonic, 536 kc., is selected by carrier amplifier 86, and added to the control carrier by mixer 90 to produce the channel 4 carrier, 30.272 mc., which is applied to modulator 105 through phase network 97 as a cosine wave, and to modulator 106 through phase network 98 as a sine wave. The outputs of modulators 101, 102, 103, 104, 105 and 106 are therefore, respectively, $$e_{a2}=F_{a2}(t)\cos w_2t \qquad (29)$$
$$e_{b2}=F_{b2}(t)\sin w_2t \qquad (30)$$
$$e_{a3}=F_{a3}(t)\cos w_3t \qquad (31)$$
$$e_{b3}=F_{b3}(t)\sin w_3t \qquad (32)$$
$$e_{a4}=F_{a4}(t)\cos w_4t \qquad (33)$$
$$e_{b4}=F_{b4}(t)\sin w_4t \qquad (34)$$

where $$\frac{w_2}{2\pi}=30.256 \text{ mc.}; \frac{w_3}{2\pi}=30.264 \text{ mc. and } \frac{w_4}{2\pi}=30.372 \text{ mc.}$$

A portion of the output of oscillator 80 is also applied to one input terminal of modulator 107, on the other input terminal of which is impressed the control carrier, 29.736 mc. Modulator 107 is designed to generate a double-sideband modulated wave with the carrier transmitted, so that its output, in accordance with the well known theory of modulators of this type is:

$$e_c=E(1+w_m\cos w_mt)\cos w_kt \qquad (35)$$

where $$\frac{w_m}{2\pi}=8000 \text{ cps.}, \frac{w_k}{2\pi}=29.736 \text{ mc.}$$

and $m$ is the modulation index, which, in this case, is made very small, for reasons to be explained later; in other words, the output of modulator 107 is almost pure carrier, with only a small amount of modulation.

The outputs of modulators 99, 100, 101, 102, 103, 104, 105, 106 and 107 are now impressed in parallel on radio transmitter 108, to form a multi-channel band which modulates the transmitter. The output of transmitter 108, which may be in the micro-wave region, is transmitted through antenna 109 to the receiving terminal, where it is received by antenna 110 and impressed on radio frequency amplifier 111. Amplifier 111 amplifies the signal and delivers it to mixer 113, which in conjunction with local oscillator 112, performs a frequency conversion in the conventional manner and reduces the frequency of the signal to the 30 megacycle range. The multi-channel band used to modulate the radio transmitter is thus reestablished in approximately its original position in the frequency spectrum. In the following discussion it is assumed that the frequency of local oscillator 112 is exactly correct to reestablish the original frequencies, and that the output of mixer 113 therefore contains 4 channel carrier frequencies, at 30.248 mc., 30.256 mc., 30.264 mc., and 30.272 mc., and the control carrier, at 29.736 mc.

Carrier amplifier 114 excludes the channel carriers but selects the control carrier 29.736 mc. and impresses it on detector 115, which rectifies it to restore the original 8000 cycle modulation. The output of detector 115 is thus an 8000 cycle wave identical in frequency and phase with the wave produced at the transmitting terminal by oscillator 80, from which all channel carriers were derived. This wave triggers multi-vibrator 116, which produces a square-topped 8000 cycle wave, rich in harmonics, and impresses it in parallel on carrier amplifiers 118, 119, 120, and 121. These amplifiers select, respectively, the 64th harmonic, 512 kc., the 65th harmonic, 520 kc., the 66th harmonic, 528 kc., and the 67th harmonic, 536 kc., and impress these harmonics on one input terminal of each of mixers 122, 123, 124 and 125, respectively. The other input terminal of each of these mixers is supplied with the control carrier, 29.736 mc. The sum frequency outputs of mixers 122, 123, 124 and 125 are therefore waves having frequencies of 30.248 mc., 30.256 mc., 30,264 mc., and 30,272 mc., respectively. These sum frequencies are transmitted as cosine demodulating carriers through phase networks 126, 128, 130 and 132 to demodulators 134, 136, 138 and 140 respectively; and as sine demodulating carriers through phase networks 127, 129, 131 and 133 to demodulators 135, 137, 139 and 141 respectively.

I. F. amplifier 117 excludes the control carrier at 29.736 mc., but selects the channel carriers at 30.248 mc., 30.256 mc., 30.264 mc. and 30.272 mc., and delivers them in parallel to demodulators 134, 135, 136, 137, 138, 139, 140 and 141.

Since the channel carriers and the demodulating carriers were all derived from a common source, oscillator 80 in the transmitting terminal, each demodulator has a demodulating carrier which is identical in phase and frequency with one of the channel carriers. It therefore demodulates that particular carrier, and delivers the original modulating function at its output terminals. The demodulating carriers have been so allocated to the demodulators that the output of channel 1A is $F_{a1}(t)$, of channel 1B, $F_{b1}(t)$ of channel 2A $F_{a2}(t)$, of channel 2B, $F_{b2}(t)$, of channel 3A, $F_{a3}(t)$, of channel 3B, $F_{b3}(t)$, of channel 4A, $F_{a4}(t)$, and of channel 4B, $F_{b4}(t)$, in each case the modulation which was impressed on the corresponding channel at the transmitting terminal. Complete and selective demodulation is thus effected.

The modulation index of the control carrier defined by Equation 35 is kept very low because if any appreciable amount of modulation were present in that portion of the output of carrier amplifier 114 which is delivered to mixers, 122, 123, 124, and 125, the output of these mixers would not be the pure carriers required for demodulating purposes, but would contain frequencies representing the sum of the respective harmonics of multi-vibrator 116 and the side bands associated with the control carrier. These components would lie at points in the spectrum occupied by channel carriers, and, in any given demodulator, would produce demodulation of channel carriers properly associated with adjacent demodulators. As the modulation index is actually very low, however, the amplitude of the side-bands associated with the control carrier is also very low, with respect to the control carrier, and components in the demodulating carriers resulting from mixing these side-bands with harmonics of multi-vibrator 116 are negligibly small. It is possible to employ a low modulating level of this nature in the control carrier without introducing excessive noise at the input to multi-vibrator 116, because the output pass-band of detector 115 is extremely narrow, and admits noise lying only a few cycles to either side of the 8000 cycle output.

If, as is actually the case, the frequencies of the channel and control carriers at the output of mixer 113 do not coincide with their counterparts in the transmitting terminal but differ widely from them due to drift in the frequency of the transmitting or receiving oscillators, the control carrier still maintains a fixed relationship to the channel carriers, and produces demodulating carriers identical in phase and frequency with the channel carriers. Drift in the transmitting and receiving oscillators is therefore of no consequence in maintaining satisfactory operation of the system, providing that it is not so wide as to cause the channel carriers or the control carrier to drift outside the pass-band of I. F. amplifier 117 and carrier amplifier 114, respectively. Figure 5 shows the frequency allocations which have been selected for the carriers and their associated amplifiers. The pass-band of I. F. amplifier 117 extends from 30,045 mc. to 30.475 mc. The channel carriers with their side bands occupy a space only 30 kc. wide, from 30.245 mc. to 30.275 mc. in the center of this pass-band. Provision is therefore made for the message carriers to drift 200 kc. to either side of their assigned position without leaving the pass-band of the I. F. amplifier. If the transmitter operates at a micro-wave frequency, as for example 4000 mc., this amount of drift ±200 kc., represents a frequency stability of ±.005%, a tolerance which can be achieved in practice.

Similarly, carrier amplifier 114 has a pass-band extending from 29.625 mc. to 29.945 mc. The modulated control carrier occupies a space 16 kc. wide, from 29.728 mc. to 29.744 mc. in the center of this band, leaving a margin of about 200 kc. on either side for frequency drift.

It is seen from Figure 5 that any phase or frequency instability in the transmitting or receiving equipment will be imparted equally to the channel carriers and control carriers, which will always maintain a fixed frequency separation (amounting, for example to 30.248–29.736 or .512 mc. in the case of channel 1). In generating the demodulating carriers, the frequency added to the control carrier is exactly equal to this separation, and as the added frequency is derived from oscillator 80 in the transmitter, the value added is identical both in the transmitter and in the receiver. It is thus seen that frequency instability has no effect on the operation of the system.

Figure 6 discloses a simpler system in which each channel carrier at the transmitting terminal and each demodulating carrier at the receiving terminal is individually derived from a separate oscillator for each channel. This system can be employed where considerations relating to cross-modulation are such as to permit the use of a detector or discriminator at the receiving terminal in place of a heterodyne oscillator, for the purpose of restoring the multi-channel band to its original position in the frequency spectrum; or where transmission is by wire line. At the transmitting terminal, channel modulators 150, 152, 154 and 156 receive cosine channel carriers from oscillators 158, 160, 162 and 164 respectively, and these same oscillators furnish sine channel carriers to modulators 151, 153, 155 and 157 respectively, through phase networks 159, 161, 163 and 165 respectively. Oscillators 150, 152, 154 and 156 are separated in frequency by twice the band width of the individual channel modulating signals, plus an allowance for drift of each oscillator. In this case, this drift allowance is made considerably larger than in the case of Figures 3 and 4, since the oscillators operate independently; and the operating frequencies of oscillators 158, 160, 162 and 164 are accordingly taken to be 2015 kc., 2005 kc., 1995 kc. and 1985 kc. respectively. The multi-channel band is placed in the 2 mc. region rather than in the 600 kc. region as in Figure 3, in order to facilitate the design of the relatively wide-band amplifiers required, and to improve the deviation where frequency modulation of the radio transmitter is employed.

Modulators 151, 153, 155 and 157 are of the double side-band carrier suppressed type employed in Figures 3 and 4, but modulators 150, 152, 154 and 156 are arranged to transmit the carrier as well as both side-bands.

The outputs of modulators 150, 151, 152, 153, 154, 155, 156 and 157 are impressed in parallel on radio transmitter 166, which may operate in the micro-wave region. The modulation employed in transmitter 166 is preferably, but not necessarily, frequency modulation effected by the means described in patent application, Serial Number 773,693, filed Septembed 12, 1947, by D. B. Harris. In any case, transmitter 166 impresses a high frequency R. E. carrier, modulated by the multi-channel band created by modulators 150, 151, 152, 153, 154, 155, 156 and 157, on antenna 189, which emits a corresponding radio wave. At the receiving terminal, this wave is picked up by antenna 190, selected and amplified by R. F. amplifier 167, heterodyned to a lower intermediate frequency (as 30 mc.) by the combined action of oscillator 169 and mixer 168, amplified by I. F. amplifier 170, and impressed on discriminator 171 (which may be a detector if amplitude modulation is employed). Discriminator 171 demodulates the wave, restoring the original multi-channel band at its original position in the frequency spectrum. The multi-channel band is amplified by band amplifier 172, and impressed in parallel on the input terminals of demodulators 181, 182, 183, 184, 185, 186, 187 and 188.

A portion of the multi-channel band voltage is also impressed in parallel on oscillators 173, 175, 177 and 179, which are tuned approximately to 2015 kc., 2005 kc., 1995 kc., and 1985 kc. respectively, the frequencies in the multi-channel band. Each oscillator is accordingly subject to the influence of the injected voltage of a cosine wave having a frequency close to its own natural frequency of oscillation, and in accordance with the well-known principles of operation of oscillators triggered by injected voltages, "pulls into step" with that voltage. Oscillators 173, 175, 177 and 179 therefore emit demodulating carriers consisting of cosine waves having frequencies of 2015 kc., 2005 kc., 1995 kc., and 1985 kc., respectively, identical in phase and frequency with the cosine channel carriers at those frequencies. These demodulating carriers are impressed on demodulators 181, 183, 185 and 187, which carry out the process of product demodulation in the manner previously described, delivering at their respective outputs the modulating functions originally associated, at the transmitting terminal, with their respective channels, $F_{a1}(t)$, $F_{a2}(t)$, $F_{a3}(t)$, and $F_{a4}(t)$.

A portion of the outputs of oscillators 173, 175, 177, and 179 is also delivered through phase networks 174, 176, 178, and 180 respectively, in the form of sine demodulating carriers, to demodulators 182, 184, 186 and 188, respectively, which demodulate the sine components of the multi-channel band in accordance with the principles of product demodulation, and deliver at their respective outputs the modulating functions originally associated at the transmitting terminal with their respective channels $F_{b1}(t)$, $F_{b2}(t)$, $F_{b3}(t)$ and $F_{b4}(t)$. Complete and selective demodulation of the input wave is therefore effected.

In the case of Figure 6, it is seen that frequency drift in the radio frequency section has no effect on the frequency of the components of the multi-channel band in the receiver since a detector or discriminator, rather than a heterodyne oscillator is used to restore the multi-channel band to its original position in the spectrum. The only requirement relating to frequency stability is therefore that the receiving oscillators shall be able to follow the frequency variation of, and remain in step with the transmitting oscillators. This requirement can be met by reasonably careful design of the transmitting and receiving oscillators.

Figure 7 is a detailed circuit drawing of the oscillator-demodulator assembly used at the receiving terminal for demodulating each pair of channels as indicated in block form for channel 1, for example, by the combination of elements 173, 174, 181, and 182, of Figure 6. In Figure 7, a common vacuum tube, indicated as tube A, contains the demodulator for the cosine channel and the oscillator, avoiding the use of an external oscillator. Tube A is a pentagrid converter such as the 6A8, containing cathode 236, grids 237, 238, 239, 240 and 241, and plate 242, all elements being connected in the circuit in a conventional manner, which need not be described in detail. The supply for oscillator grids 237 and 238 is derived from the tuned oscillating circuit consisting of transformer windings 207 and 208, and condenser 210. The ground return from winding 207 passes through synchronizing potentiometer 251, on the input terminals of which is impressed a portion of the input signal wave, through condenser 250; injected voltage components of the signal wave, appearing across potentiometer 251 are therefore delivered to grid 237, causing grids 237 and 238 to oscillate at the frequency of and in phase with that particular cosine channel carrier to which they are most closely tuned by the setting of condenser 210 (sine carriers are not transmitted). The product demodulation of that particular cosine carrier is therefore performed by tube A in the maner previously described, the resulting modulating function being delivered to the output terminals of the channel through output transformer 216 and a low pass filter comprising inductive reactances 218, 219, 220 and 221, and condensers 222, 223 and 224.

The input wave enters the circuit through a tuned input circuit consisting of transformer 200 and condenser 201, which also delivers the input wave, in parallel, to the synchronizing potentiometer 251 and signal grid 244 of tube B. Tube B is a pentagrid mixer tube such as the 6L7 containing cathode 243, grids 244, 245, 246, 247 and 248, and plate 249, all elements being connected in the circuit in a conventional manner which need not be described in detail. The supply for oscillator grid 246 is derived from a tertiary winding 209, of the oscillating circuit associated with tube A, in parallel with tuning condenser 211, and through a phase network consisting of resistors 212 and 213, and condensers 214 and 215, which alters the phase of the wave by 90°. If we consider the demodulating carrier impressed on grids 237 and 238 of tube A to be a cosine wave, the demodulating carrier impressed on grid 246 of tube B is accordingly a sine wave. Tube B therefore demodulates the sine channel carrier on the same frequency as the cosine channel carrier demodulated by tube A, and delivers the resulting modulating function at the output terminals of the channel through output transformer 217 and a low pass filter comprising inductive reactances 225, 226, 227 and 228, and condensers 229, 230 and 231.

Resistors 202 and 204 and condensers 203 and 205 maintain the grid bias of tubes A and B respectively, at the center of the linear portions of their characteristic curves, as demonstrated in Figure 2B, and their screen grids are supplied by resistors 234 and 235, respectively. "B" voltage for the oscillator section of tube A is provided by resistor 232. Condenser 233 provides a bypass for high frequency around this resistor.

In practice the setting of synchronizing potentiometer 251 is kept as low as possible, consistent with adequate synchronization, in order to reduce to the greatest possible extent the transmission through tube A of extraneous sideband and carrier components, which might cause cross-modulation or distortion in both tubes. Experience shows that there is no difficulty in finding a setting of potentiometer 251 such that extraneous components are suppressed below audibility, while adequate synchronization is still obtained.

It is emphasized that where, in the foregoing specification, mention has been made of specific frequencies, or of specific expedients implementing the general principles involved, such mention has been made for illustrative purposes only, and is not to be construed as limting the scope of the invention to the expedients and frequencies mentioned. For example, audio-frequency, carrier frequency, video-frequency, or radio frequency waves, or light waves may be used in the transmission portions of the system. Similarly, the modulation applied to the individual channels need not necessarily be audio frequency, but may be radio-frequency, video-frequency, or may even be on-off D. C. where it is desired to use one or more channels for the control of servo mechanisms, or for telephone supervision applications. In general, carriers may be either transmitted or suppressed, taking into consideration the fact that the transmission of carriers has a tendency to increase the intelligible cross-modulation. Systems of modulation used in the transmission section may be AM, FM, PM, PAM, PPM, PCM, etc. depending upon the needs of the particular application. Demodulating elements are not necessarily vacuum tubes, as illustrated in the figures, but may be transducers of any type having characteristics conforming with the requirements of the theoretical discussion of the principles involved; in other words, any transducers providing output responses linearly proportional to the product of two input signals. In particular, crystals or copper-oxide rectifiers having bilateral conductivity characteristics can in many cases be used in place of the vacuum tubes shown.

Although the 3 systems disclosed in detail provide cosine and sine channels on each carrier frequency, it is obvious that any combination of carriers may be used, and, if desired, the cosine channels only, or the sine channels only, may be employed in a multi-channel system, or certain channel frequencies may employ two carriers and others only one. The number of carriers used is also not pertinent to the scope of the invention; for example, a complete dual-channel system may comprise a cosine carrier and a sine carrier on the same frequency; and a single channel system may have either a cosine or a sine carrier on a single frequency, demodulated by the product demodulation method.

What is claimed is:

1. In a multi-channel communication system wherein the modulated carrier wave of each channel is demodulated at the receiving terminal by multiplying the instantaneous amplitude of the received complex wave by the instantaneous amplitude of a demodulating carrier wave having the same phase and frequency as the particular carrier wave being demodulated, a system for producing said demodulating carrier waves comprising at the transmitting terminal a common multivibrator adapted to generate a low frequency fundamental wave and harmonics thereof, and filters for selecting one of said harmonics for use as the carrier wave of each channel, and at said receiving terminal, a series of frequency dividers and a filter adapted to select one of said carrier waves, and to apply said carrier wave to said series of frequency dividers to control the generation of a wave identical with said low frequency fundamental wave and harmonics, filters for selecting for use as the demodulating carrier of each channel the particular one of said harmonics which is identical with the harmonic selected at the transmitting terminal as the carrier wave of that particular channel, and a series of mixers receiving the incoming waves to mix them respectively with one of the outputs of said filters, and a biasing network connected to each of said mixer tubes for maintaining operation of the tubes in that region of their characteristics where the signal grid-plate transductance is substantially constant with change in signal grid voltage.

2. In a multi-channel communication system wherein the modulated carrier wave of each channel is demodulated at the receiving terminal by multiplying the instantaneous amplitude of the received complex wave by the instantaneous amplitude of a demodulating carrier wave having the same phase and frequency as the particular carrier wave being demodulated, a system for producing said demodulating carrier waves comprising, at the transmitting terminal, a common multivibrator adapted to generate a low frequency fundamental wave and harmonics thereof and a common oscillator adapted to generate a wave of intermediate frequency, a filter and mixer for selecting one of said harmonics and mixing said harmonic with said intermediate frequency wave to produce a heterodyne frequency wave used as the carrier of each channel, means for modulating said intermediate frequency wave by said low frequency wave, and at said receiving terminal a detector for demodulating said intermediate frequency wave to restore said low frequency fundamental wave, a multivibrator triggered by said low frequency fundamental wave to generate harmonics of said low frequency fundamental wave, and means for mixing selected harmonics with said intermediate frequency wave to produce a heterodyne frequency wave for use as the demodulating carrier of each channel, identical in phase and frequency with the carrier of said channel, and said means for mixing comprising mixer tubes which are biased so as to maintain operation in that region of their characteristic where the signal grid-plate transductance is substantially constant with change in signal grid voltage.

3. A multi-channel communication system comprising a transmitting terminal including oscillators and modulators associated with each channel adapted to produce for each channel a modulated carrier wave having a frequency differing from the frequency of the carrier wave of each other channel, and a receiving terminal having demodulators associated with each channel adapted to demodulate, separately and individually, each of said modulated carriers solely, by multiplying linearly the instantaneous amplitude of the complex received wave by the instantaneous amplitude of a wave having the same frequency and phase as the particular carrier being demodulated, and said demodulators comprising mixer tubes and biasing networks connected together such that the biasing networks cause operation of the mixer tubes in that region of their characteristic where the signal grid-plate transductance is substantially constant with change in signal grid voltage.

4. In a multi-channel transmission system, where each channel of the system comprises an amplitude modulated carrier wave, displaced in frequency with respect to the carrier waves of other channels, a demodulating system for each channel comprising an oscillator providing a demodulating carrier wave identical in phase and frequency with the carrier wave of said channel, a low pass filter, and a demodulator adapted to deliver to said filter a wave having an instantaneous amplitude equal to the linear product of the instantaneous amplitude of said demodulating carrier and the sum of the instantaneous amplitudes of the carrier waves of all channels, and said demodulator comprising a mixer tube and a biasing network connected together such that the biasing network causes operation of the mixer tube in that region of its characteristic where the signal grid-plate transductance is substantially constant with changes in signal grid voltage, and substantially proportional to the oscillator grid voltage.

5. In a multi-channel transmission system wherein each channel in a first group of channels comprises an amplitude modulated carrier wave displaced in frequency with respect to the carrier waves of other channels, and each channel in a second group of channels comprises an amplitude modulated carrier wave identical in frequency with one carrier wave in said first group of channels, but displaced in phase by 90 electrical degrees with respect to said carrier wave in said first group of channels, a demodulating system for each channel comprising an oscillator for furnishing a demodulating carrier wave identical in phase and frequency with the carrier wave of said channel, a low pass filter, and a demodulator adapted to deliver to said filter a wave having an instantaneous amplitude equal to the linear product of the instantaneous amplitude of said demodulating carrier and the sum of the instantaneous amplitudes of the carrier waves of all channels, and said demodulator comprising a mixer tube and a biasing network connected together such that the biasing network causes operation of the mixer tube in that region of its characteristic where the signal grid-plate transductance is substantially constant with change in signal grid voltage.

6. A multi-channel transmission system comprising a transmitting station having a plurality of carrier frequency generators, a plurality of modulators modulating each carrier frequency with an audio signal, means for transmitting said plurality of modulated carrier signals to a receiver comprising, a plurality of frequency generating means generating the various frequencies of the incoming modulated signals, phase-controlling means receiving the outputs of said frequency generating means to synchronize them with the incoming carrier signals of the same frequency, a plurality of demodulators receiving the entire input of said receiver and an input from said phase-controlling means, and each demodulator linearly multiplying the inputs to obtain the audio output of the carrier frequency equal to the frequency of the signal received from the phase-controlling means, and said demodulators comprising mixer tubes biased so as to operate in that region of their characteristics where the signal grid plate transductance is substantially constant with change in signal grid voltage.

DONALD B. HARRIS.

REFERENCES CITED

The following references are of record in the file of this patent:

UNITED STATES PATENTS

| Number | Name | Date |
|---|---|---|
| 1,608,566 | Potter | Nov. 30, 1928 |
| 1,882,119 | Chireix | Oct. 11, 1932 |
| 1,885,010 | Day | Oct. 25, 1932 |
| 2,017,886 | Barden | Oct. 22, 1935 |
| 2,213,941 | Peterson | Sept. 3, 1940 |
| 2,256,317 | Earp | Sept. 16, 1941 |
| 2,258,439 | Bennett | Oct. 7, 1941 |
| 2,276,863 | Peterson | Mar. 17, 1942 |
| 2,323,250 | Smith | June 29, 1943 |
| 2,342,286 | Kock | Feb. 22, 1944 |
| 2,410,883 | Larsen et al. | Nov. 12, 1946 |

FOREIGN PATENTS

| Number | Country | Date |
|---|---|---|
| 15,559 | Great Britain | Dec. 13, 1933 |